US006795862B1

United States Patent
Keohane et al.

(10) Patent No.: US 6,795,862 B1
(45) Date of Patent: Sep. 21, 2004

(54) SYSTEM FOR CONVERTING A VERSION OF SNMP ENTERED BY USER INTO ANOTHER VERSION USED BY DEVICE AND PROVIDING DEFAULT VALUES FOR ATTRIBUTES NOT BEING SPECIFIED

(75) Inventors: Susann Marie Keohane, Austin, TX (US); Danling Shi, Austin, TX (US); Kurt Russell Taylor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 09/583,709

(22) Filed: May 31, 2000

(51) Int. Cl.[7] ............................................... G06F 15/16
(52) U.S. Cl. ........................ 709/230; 709/246; 370/466
(58) Field of Search ................................ 709/202, 224, 709/226, 223, 220, 246, 230; 370/254, 410, 465, 353, 466

(56) References Cited

U.S. PATENT DOCUMENTS

| | | | | |
|---|---|---|---|---|
| 5,561,769 A | * | 10/1996 | Kumar et al. | 709/202 |
| 6,404,743 B1 | * | 6/2002 | Meandzija | 370/254 |
| 6,427,170 B1 | * | 7/2002 | Sitaraman et al. | 709/226 |
| 6,466,583 B1 | * | 10/2002 | Laraqui | 370/465 |
| 6,493,756 B1 | * | 12/2002 | O'Brien et al. | 709/224 |
| 6,560,222 B1 | * | 5/2003 | Pounds et al. | 370/353 |
| 2002/0085571 A1 | * | 7/2002 | Meandzija | 370/410 |

OTHER PUBLICATIONS

Stallings, "Security Comes to SNMP: The New SNMPv3 Proposed Internet Standards", Dec. 1998, The Internet Protocol Journal, vol. 1, No. 3, pp. 2–12.*

* cited by examiner

Primary Examiner—Le Hien Luu
(74) Attorney, Agent, or Firm—Duke W. Yee; Volel Emile; Steven T. McDonald

(57) ABSTRACT

A method and an apparatus for converting configuration information input in a format for a first version of a management protocol into configuration information for a second version of the management protocol is provided. In particular, a method and apparatus for converting Simple Network Management Protocol version 1/2c (SNMPv1/v2c) style community-based access configuration information into user-based access information for configuring a SNMPv3 agent is provided. The method and apparatus make use of various graphical user interfaces to allow a user to enter configuration information in a format with which the user is familiar. The method and apparatus of the present invention then maps the configuration information into a format used by the device being configured.

54 Claims, 10 Drawing Sheets

100
Network

Community String = public
View = whole tree
Access = read only

Figure 6A

Security Name(v3) = Community String(v1) = public
Community Name(v3) = public
Security Level(v3) = No Authentication, No Privacy
Security Model(v3) = SNMPv1
Security Access(v1, v3) = read only
View(v1, v3) = whole tree

Figure 6B

Community String = admin
View = 2
Access = read write

Figure 7A

Security Name(v3) = Community String(v1) = admin
Community Name(v3) = admin
Security Level(v3) = No Authentication, No Privacy
Security Model(v3) = SNMPv1
Security Access(v1, v3) = read write
View(v1, v3) = 2

Figure 7B

SYSTEM FOR CONVERTING A VERSION OF SNMP ENTERED BY USER INTO ANOTHER VERSION USED BY DEVICE AND PROVIDING DEFAULT VALUES FOR ATTRIBUTES NOT BEING SPECIFIED

BACKGROUND OF THE INVENTION

1. Technical Field

The present invention relates generally to an improved method and an apparatus for configuring the Simple Network Management Protocol (SNMP) agent. Still more particularly, the present invention provides a method and an apparatus for configuring community-based access like that found in SNMPv1 (version 1) within the user-based security model of SNMPv3 (version 3).

2. Description of the Related Art

The Simple Network Management Protocol (SNMP) is a widely used network monitoring and control protocol. SNMP agents report information from various network components, such as hubs, routers, and bridges, to a management workstation console used to manage the network. This information is contained in a Management Information Base (MIB), which is a data structure that defines what information is obtainable from the network component and what can be controlled by the network component.

Versions 1 and 2 of SNMP (SNMPv1 and SNMPv2) used a community-based security model based on a shared, unencrypted community string. This string acts as both a user and password for the community-based SNMP session. Because this string is unencrypted, it is possible for an intruder to intercept this string and discover or disrupt the network configuration. This security loophole is corrected in version 3 (SNMPv3) by moving to the user-based security model. Although this new model is more secure, it is also much more complex and many network managers familiar with using SNMPv1 may find it very difficult to use the new model.

Therefore, it would be advantageous to have a method and an apparatus that allows the simplicity of use of the community-based model and, at the same time, matches the requirements of the user-based model. This simplified user interface and mapping enables a network manager to process information in a fashion similar to SNMPv1 but to use the more robust SNMPv3 software underneath.

SUMMARY OF THE INVENTION

The present invention provides a method and an apparatus for converting configuration information input in a format for a first version of a management protocol into configuration information for a second version of the management protocol. In particular, a method and apparatus for converting Simple Network Management Protocol version 1/2c (SNMPv1/v2c) style community-based access configuration information into user-based access information for configuring a SNMPv3 agent is provided. The method and apparatus make use of various graphical user interfaces to allow a user to enter configuration information in a format with which the user is familiar. The method and apparatus of the present invention then maps the configuration information into a format used by the device being configured.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6A is an exemplary diagram illustrating access to an entire MIB tree using SNMPv1;

FIG. 6B is an exemplary diagram illustrating access to an entire MIB tree using SNMPv3;

FIG. 7A is an exemplary diagram illustrating access to a subtree of a MIB tree using SNMPv1;

FIG. 7B is an exemplary diagram illustrating access to a subtree of a MIB tree using SNMPv3.

DETAILED DESCRIPTION OF THE PREFERRED EMBODIMENT

Figure 1:
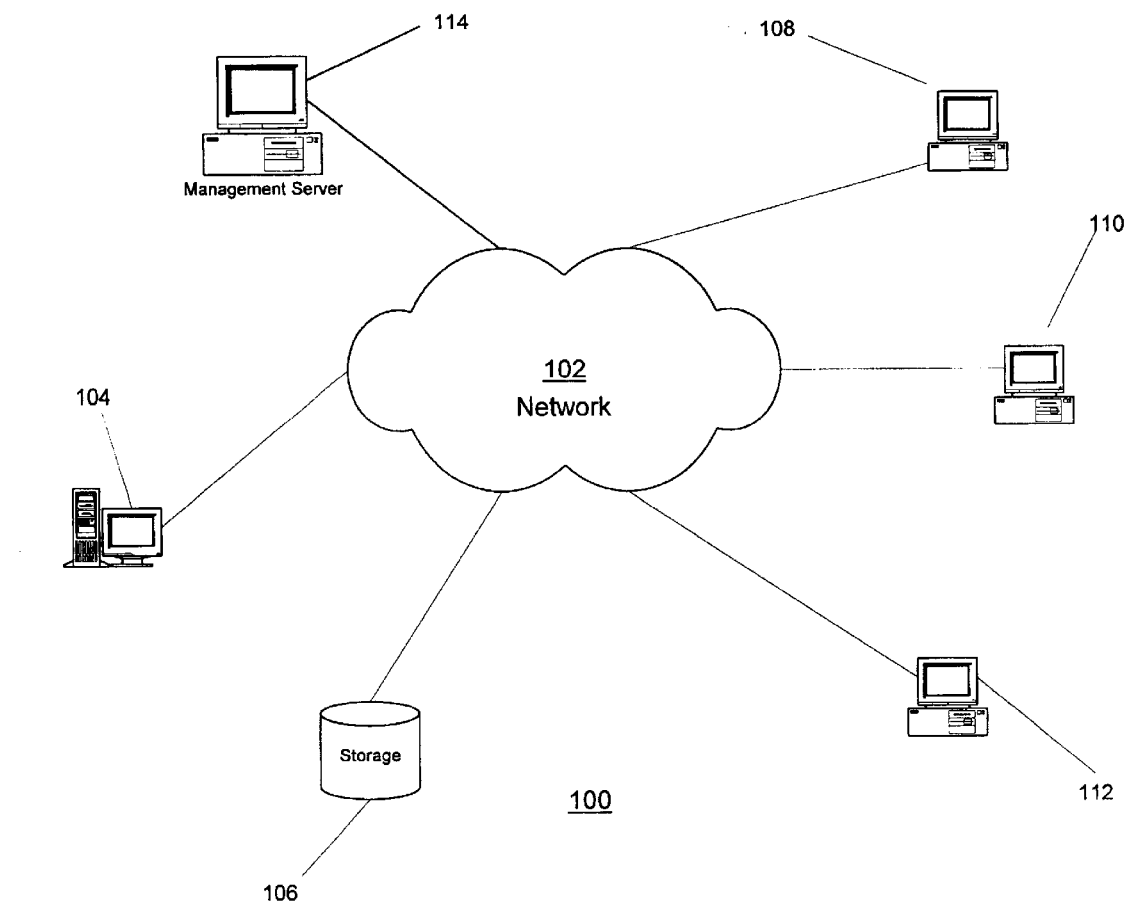
FIG. 1 is an exemplary diagram of a distributed data processing system in which the present invention may be implemented.

With reference now to the figures, FIG. 1 depicts a pictorial representation of distributed data processing system 100 in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network.

In the depicted example, server 104 provides data, such as boot files, operating system images, and applications to clients 108–112. Clients 108, 110, and 112 are clients to server 104. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN).

A management server 114 is connected to the network 102. The management server 114 runs one or more network device management applications that remotely manage the various network devices 104–112 based on management information gathered from the network devices 104–112. The network devices are remotely managed, for example, using the Simple Network Management Protocol (SNMP), or other equivalent management protocol. SNMP is a widely-used network monitoring and control protocol. Data is passed from SNMP agents, which are hardware and/or software processes reporting activity in each network device 104–112 to the computing device used to oversee the network, i.e. management server 114. The agents return information contained in a Management Information Base (MIB), which is a data structure that defines what is obtainable from the device and what can be controlled (turned off, on, etc.).

FIG. 1 is intended as an example, and not as an architectural limitation for the present invention. As may be readily apparent to those of ordinary skill in the art, many other types of devices may be connected to the network 102 without departing from the spirit and scope of the present invention. For example, the network 102 may provide a communication pathway for client devices to send and receive data from printers, plotters, scanners, multiple drive libraries, and the like.

While the preferred embodiments of the present invention will be described with reference to various versions of the SNMP management protocol, it should be appreciated by those of ordinary skill in the art that the present invention is not limited to use of these versions of the SNMP management protocol. Rather, the present invention is applicable to any protocol in which multiple versions of the protocol are utilized and mapping of configuration information from one version of the protocol to another is desirable.

Figure 2:
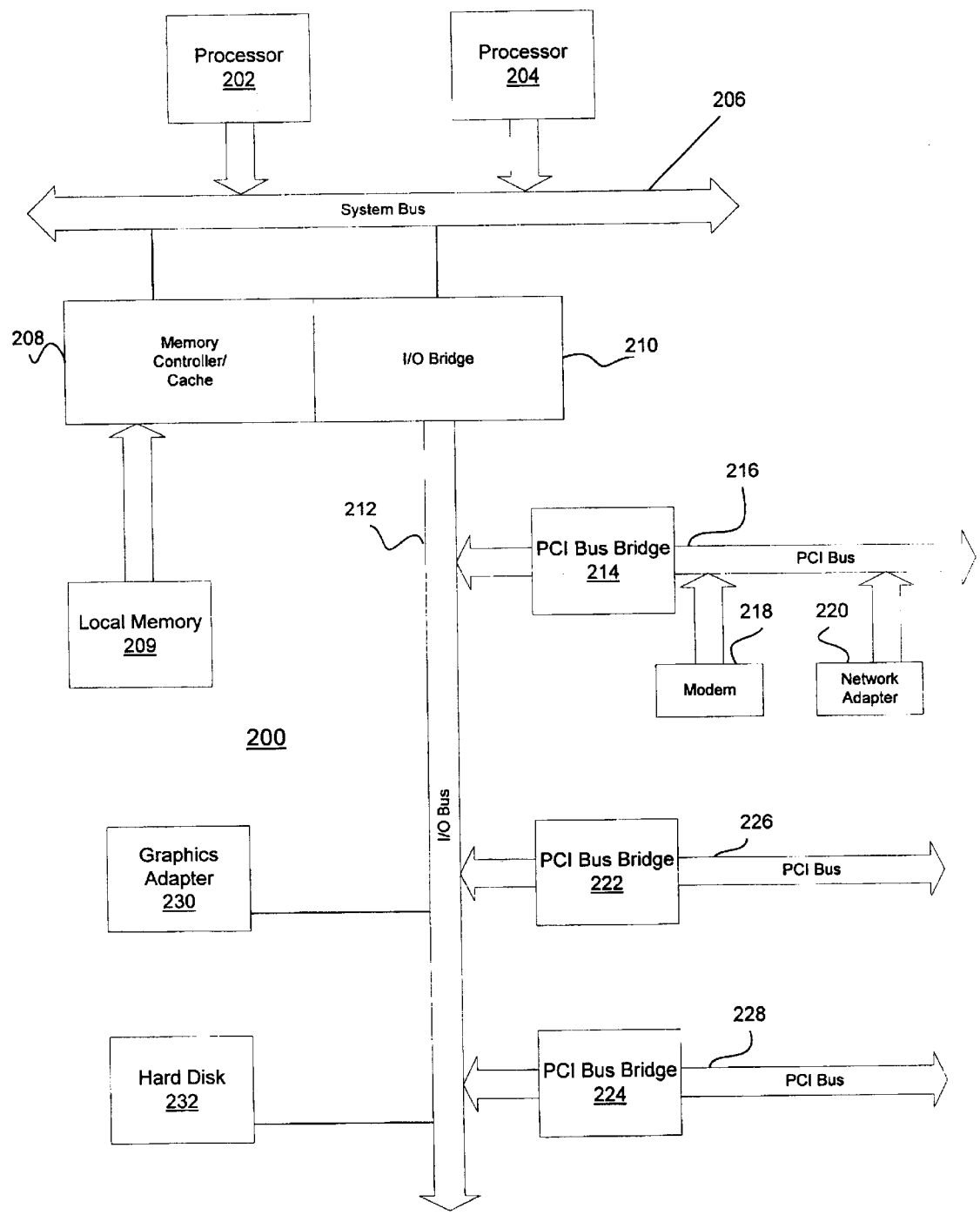
FIG. 2 is an exemplary block diagram of a management server according to the present invention.

Referring to FIG. 2, a block diagram of a data processing system that may be implemented as a management server, such as management server 114 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted.

The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

The management server, such as management server 114, includes one or more network device management applications used to remotely manage a plurality of network devices 104–112 over a network 102. These one or more network device management applications may be stored in local memory 209, for example, and used to control the operations of the processor 202 or 204 in a remote server. In addition, the management application 114 stores information related to the MIB extensions useable with the various network devices 104–112. These MIB extensions are then used by the management server 114, under control of the one or more network device management applications, to manage the operations of the network devices 104–112.

A typical SNMP management environment consists of a management system, such as management system 114 in FIG. 1, and a server system, such as server 104 in FIG. 1. The management system runs one or more management applications, such as a remote SNMP management application. Server 104, which is being managed by the management server 114, contains an SNMP agent that is configured by the server system management application. The server system management application has a user interface which makes it less difficult to configure the SNMP agent.

Figure 3:
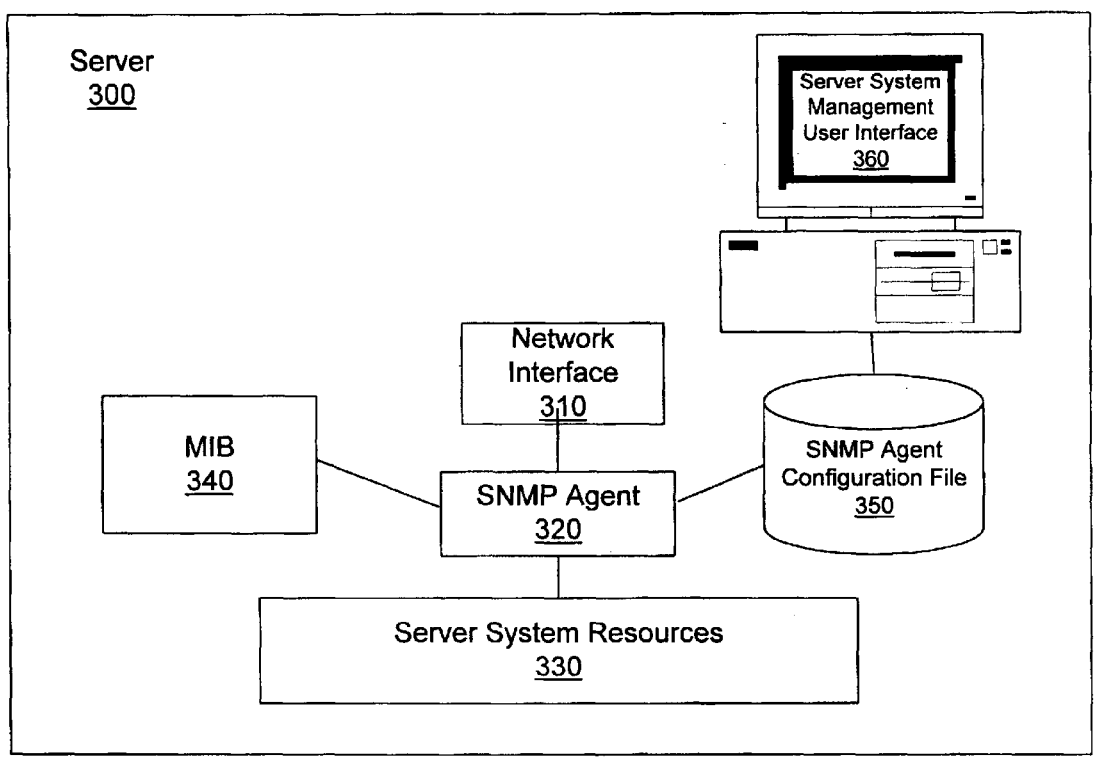
FIG. 3 is an exemplary functional block diagram of a SNMP managed server according to the present invention.

With reference now to FIG. 3, a block diagram illustrating an SNMP agent device according to the present invention is provided. As shown in FIG. 3, the SNMP agent device is a server 300, which might be server 104 in FIG. 1. The server 300 includes a network interface 310, a SNMP agent 320, one or more server system resources 330, a MIB information storage 340, a SNMP configuration file 350 stored on a disk drive, and a Server System Management program 360 that may be used to modify one or more configuration files 350 associated with the server 300. These different elements 310–360 may be implemented, for example, in hardware, as software running on a processor, or a combination of hardware and software on the server 300.

The network interface 310 allows the server 300 to communicate with network devices via the network 102 using a data transmission protocol. For example, in the case of the network 102 being the Internet, the network interface 310 provides an interface for communicating with other network devices via the Transmission Control Protocol/Internet Protocol (TCP/IP) suite of protocols.

The SNMP agent 320 uses commands, scripts, etc. to obtain information about the server system resources 330. The server system resources 330 may include, for example, device drivers, command lines, data structures, and the like. The information obtained by the SNMP agent 320 is then stored in the form of MIB information in the MIB information storage 340. This MIB information storage 340 may be a non-persistent storage device, such as a RAM, or persistent storage device, such as a hard drive. The MIB information follows the MIB tree data structure format which is an SNMP data structure that describes the particular device being monitored.

The Server System Management User Interface 360 is a part of a server system management application that allows a system administrator to configure the server 300 for use in the network 102. The Server System Management User Interface 360 provides an easily understandable graphical user interface (GUI) through which configuration information is entered into the server 300 and stored as configuration information in one or more configuration files 350. The Server System Management User Interface 360 allows a system administrator to enter the server configuration information in a form that is substantially similar to SNMPv1 and/or SNMPv2c even though the server 300 makes use of SNMPv3 for communicating with SNMP management applications. Without this innovation, a system administrator, formerly familiar with SNMPv1 or SNMPv2c community-based configuration, would have a much more difficult time configuring the agent to have a equivalent level of security.

The present invention provides a graphical user interface with a similar look and feel of a community-based configuration. The user interface provides a series of graphical user interface windows that allow a user to enter configuration information. In particular, the user may be provided with a graphical user interface window that is formatted for entry of SNMPv3 user-based security model (USM) configuration information. However, if the user is not familiar with SNMPv3 USM or does not wish to enter configuration information with all the added security, the user may choose a SNMPv1/v2c-like community-based model graphical user interface using an input device. The user may then enter configuration information as if configuring a SNMPv1/v2c server with the configuration information being stored as SNMPv3 configuration information. This user interface is best understood through a sequence of screen images.

Figure 4A:
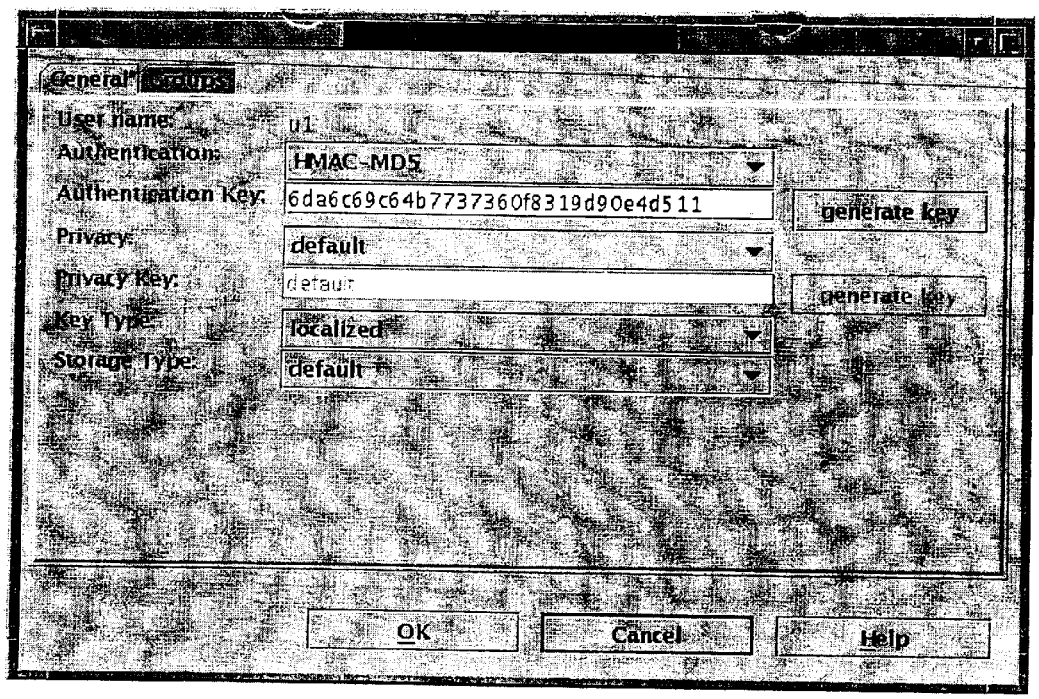
FIG. 4A is an exemplary screen image illustrating some general information needed to configure a system using SNMPv3.

FIG. 4A is an exemplary screen image illustrating some of the information that must be entered to fully configure a system using SNMPv3. This invention allows the user to take full advantage of the user-based security model associated with SNMPv3 while also offering the simplicity of entering configuration information using SNMPv1 and/or SNMPv2c familiar attributes.

Figure 4B:
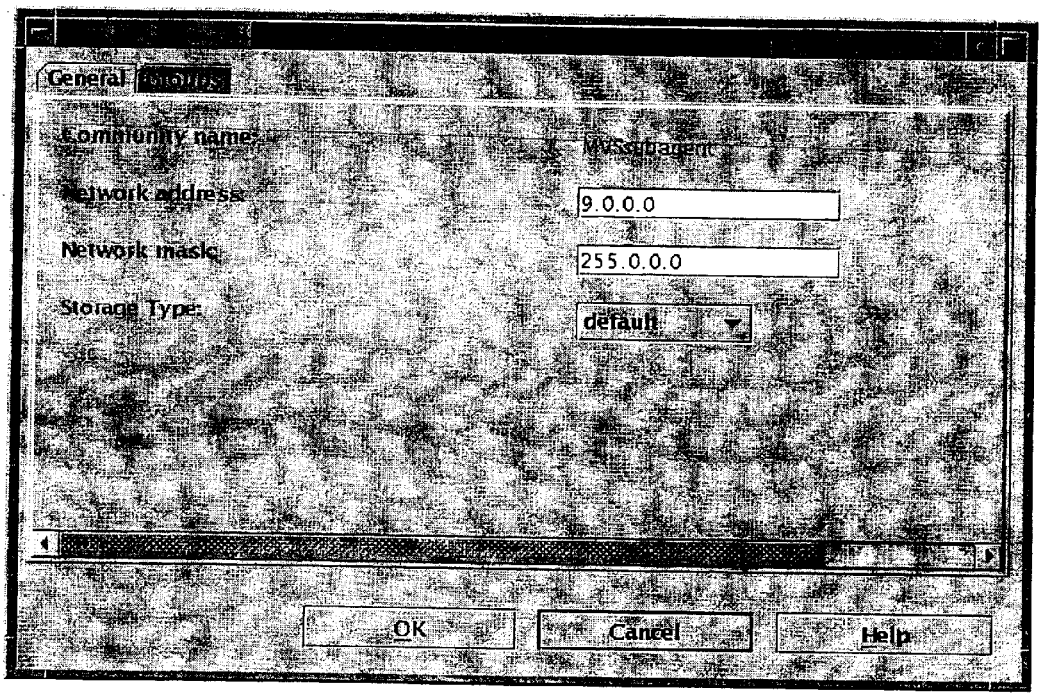
FIG. 4B is an exemplary screen image illustrating a subset of information needed to configure a system using SNMPv1.

As shown in FIG. 4B, where a screen image illustrates a simpler SNMPv1 community-based security model, it is possible for a user only familiar with SNMPv1 and SNMPv2c to more easily use the system. The familiar "Community Name" in SNMPv1 or SNMPv2c is mapped to the "User Name" in SNMPv3 in FIG. 4A. The "Authentication" and "Privacy" fields of FIG. 4A are not present in the simplified SNMPv1 graphical user interface and thus, the absence of these attributes map to "NoAuthNoPriv" as the security level in SNMPv3. The storage type in FIG. 4B maps to the storage type in FIG. 4A. Additional SNMPv1/v2c specific information, such as the network address and network mask are also enterable via the simplified SNMPv1 interface shown in FIG. 4B.

Figure 4C:
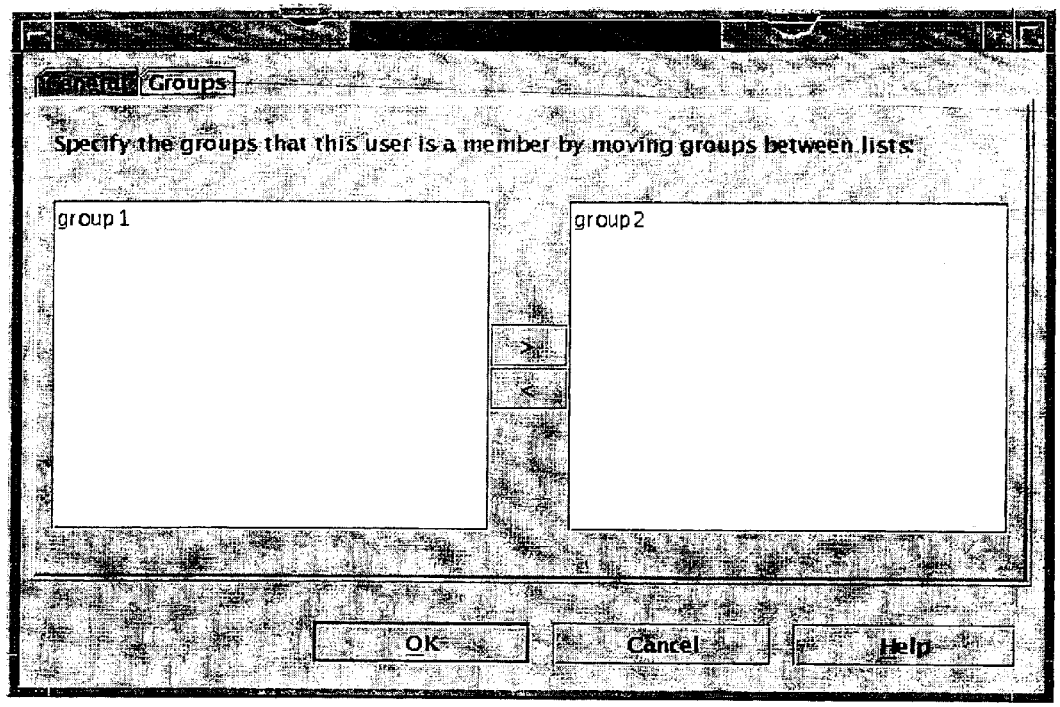
FIG. 4C is an exemplary screen image illustrating the determination of group membership using SNMPv3.

FIG. 4C is an exemplary screen image illustrating the determination of group membership under SNMPv3. If an item in the left list is moved to the right list by pressing the ">" button, then the user becomes a member of that group. In a similar manner, pressing the "<" button moves a selected item from the group membership list on the right to the "nonmembership" list on the left. Because a SNMPv3 user can only be assigned to a SNMPv3 group, there is no designation of SNMP version in these lists.

Figure 4D:
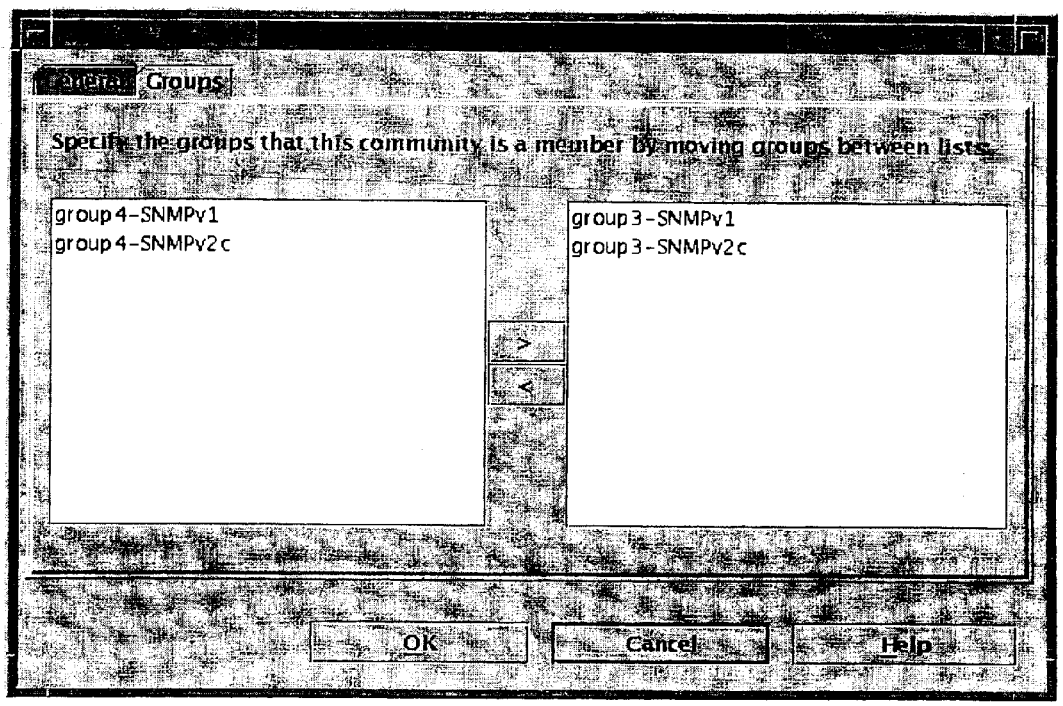
FIG. 4D is an exemplary screen image illustrating the determination of group membership using SNMPv1/v2c.

FIG. 4D is an exemplary screen image illustrating the defined groups available for a SNMPv1/v2c community. A community cannot be assigned to a SNMPv3 group. The groups shown specify whether they are a SNMPv1 or a SNMPv2c group since that information is available for configuration of a community group. The difference between SNMPv1 and SNMPv2c is for configuring the SNMP agent to specify the details of the protocol session. The functional operation of this interface for enrolling or disenrolling in a group is the same as that described for FIG. 4C.

Figure 4E:
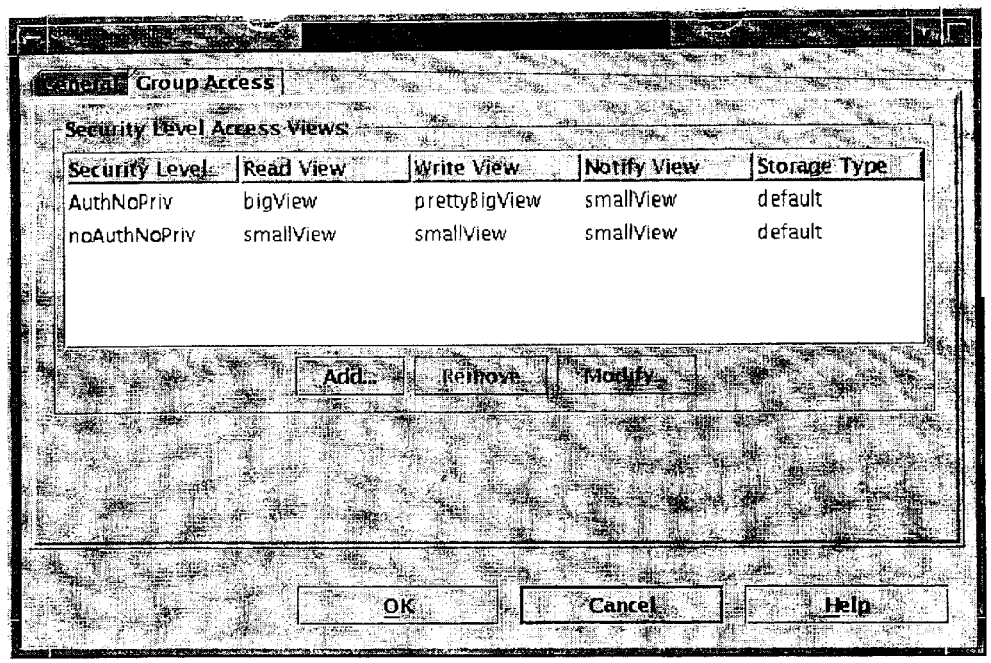
FIG. 4E is an exemplary screen image illustrating the choice of security levels using SNMPv3.
Figure 4F:
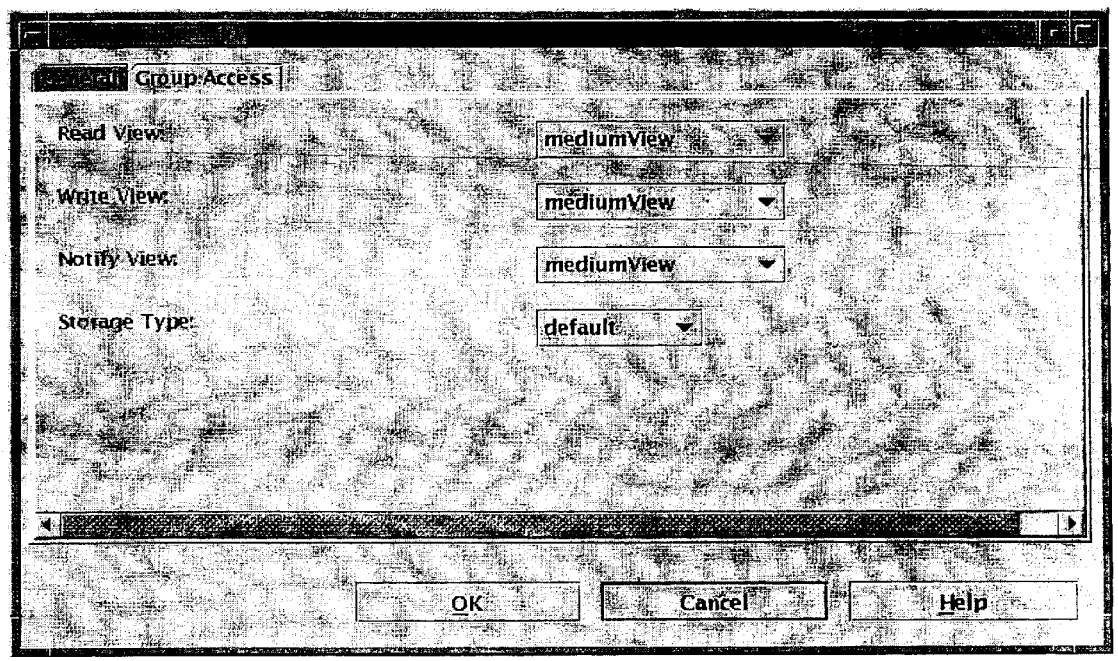
FIG. 4F is an exemplary screen image illustrating the default of security levels using SNMPv1.

FIG. 4E is an exemplary screen image illustrating the choice of all available security levels to a SNMPv3 group, as well as choices for the Read View, Write View, Notify View and Storage Type. This particular screen image shows two combinations of values. In particular, the first combination specifies the use of Authentication but no use of Privacy. The second combination specifies no Authentication and no Privacy. This latter level is the only security level available in the SNMPv1/v2c model. Hence, as shown in FIG. 4F, the version of the screen for the SNMPv1 model does not allow specification of the security levels since these values must default to no Authentication and no Privacy.

The screen images shown in FIGS. 4A–4F illustrate the graphical user interface that is a part of the present invention. For each interaction there is a first interface that allows the user to take advantage of all features available in SNMPv3 and a second interface that restricts options for those more familiar with the community-based SNMPv1/v2c models. Those options omitted on these screens are assigned default values. Thus, even though configuration information may be entered as if the server were operating under SNMPv1/v2c, the reality is that all configuration information is stored in configuration files as SNMPv3 configuration information. The next sequence of figures illustrates the mapping between the SNMPv1/v2c models and the SNMPv3 model. To illustrate this in detail, an understanding of node designation in an MIB tree is needed.

Figure 5:
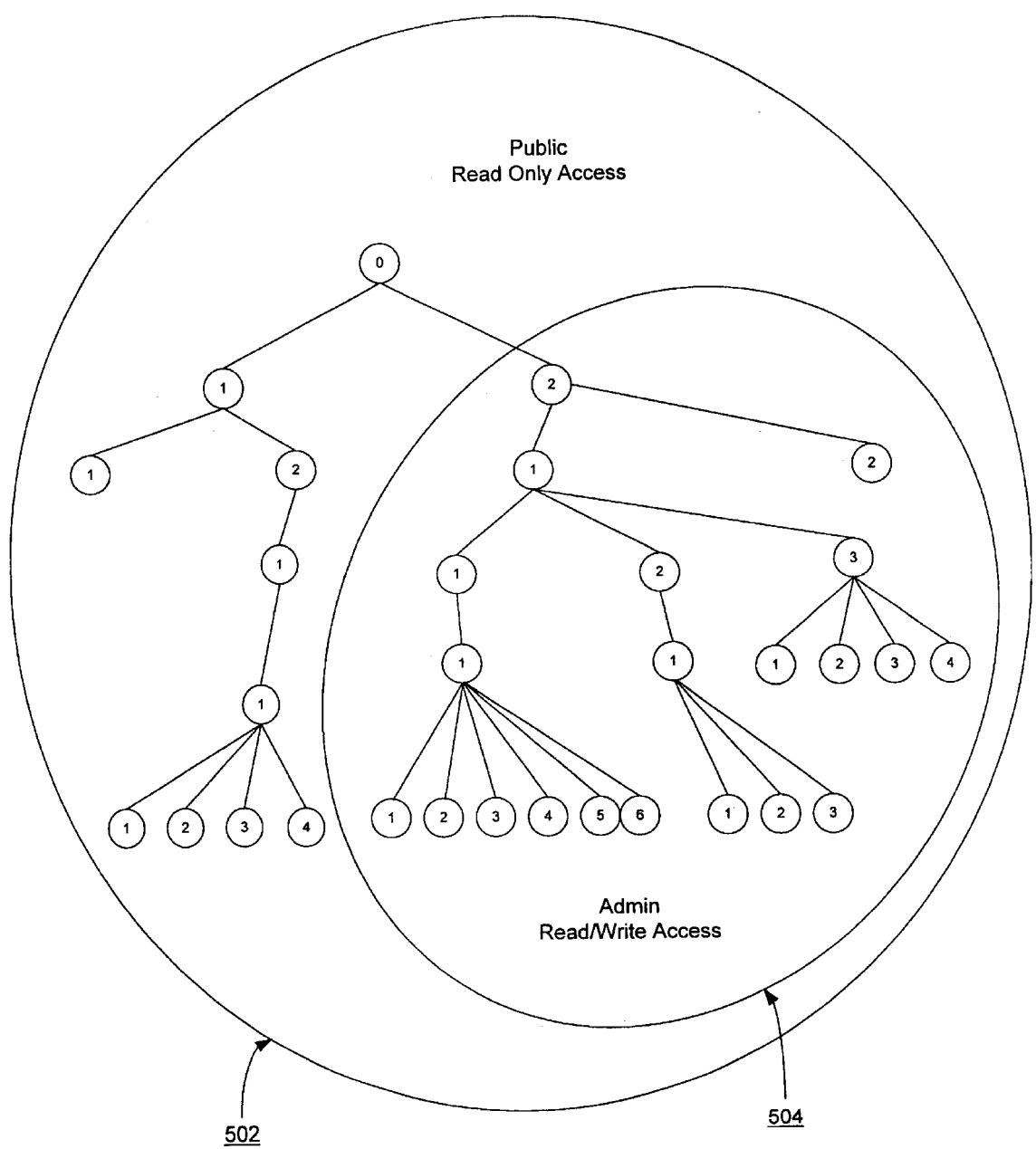
FIG. 5 is an exemplary diagram illustrating an MIB tree data structure.

FIG. 5 is an exemplary diagram of a MIB tree data structure 500 according to the present invention. FIG. 5 is only intended to be a simplified depiction of a fictitious MIB tree data structure that will aid in the understanding of the present invention and does not necessarily correspond to an actual MIB tree data structure standardized by the Internet Engineering Task Force (IETF). It should be noted that, while FIG. 5 depicts some nodes as having a single branch, these nodes may contain additional branches which are not shown for clarity. FIG. 5 is only an example to illustrate the operation and benefits of the present invention, actual implementations may make use of different MIB tree data structures of more or less complicated architectures.

As shown in FIG. 5, the nodes of the MIB tree data structure (hereafter referred to as the "MIB tree") designate "objects" and are represented by object identifiers (OIDs). An "object" in the context of a MIB tree refers to an entry in the MIB tree. These object OIDs are often referred to by their human readable branch names rather than their numerical value. Thus, for example, an object OID of a MIB tree may have a numerical value but be referred to as "Age" or "Name" or the like. The objects of the MIB tree represent tables and record entries within tables. Thus, for example, a table "Person" may be comprised of records having entries corresponding to an index, a name, an age, and a shoe size.

The objects of the MIB tree are designated by numerical values identifying the branch taken from the previous node in the tree to arrive at the current node. A node, therefore, is identified by the numerical values of that node's parent nodes, each separated by a period, in the adopted convention. Thus, for example, the string of numerical values "0.1.1" designates the left most node in the third layer down in the MIB tree depicted in FIG. 5. Similarly, "0.1.2.1.1.1" designates the left most node in the bottom layer of the MIB tree. These strings of numerical identifiers are often referred to as object identifiers or OIDs. By convention, the leading "0" in the OID is left off. Thus, the OID "0.1.2.1.1.1" will be referred to as "1.2.1.1.1".

In the example shown in FIG. 5, the community depicted is "public" with a MIB view for the "public" community being defined as the whole MIB tree 502. The "public" community is only provided with read only access. The community string "public" acts as a user name and password for the community-based session. Thus, for the community "public," the community string is "public", the MIB view is of the whole tree, and the access is to this MIB view is read only.

In addition, a different community could be specified, such as the "admin" community 504, which may have different MIB tree views and different levels of access and may also be represented in SNMPv1 and converted to SNMPv3 format as will be described hereafter. FIG. 6A is an example of SNMPv1 configuration information for the example shown in FIG. 5. As shown in FIG. 6A, the configuration information for SNMPv1 includes the community string, the view and the access. SNMPv3 is more robust and more complex in implementing security protection than SNMPv1 or SNMPv2c. Additional information for this user-based security model includes, for example, a Security Name, a Security Level, which includes authentication and encryption, and a Security Model. Thus, with the present invention, configuration information entered using a SNMPv1 graphical user interface window must be mapped to the more complex SNMPv3 configuration information format.

FIG. 6B shows a mapping of the SNMPv1 information given in FIG. 6A into the user-based security model of SNMPv3. In particular, the Security Name in SNMPv3 is the same as the Community String in SNMPv1. The Community Name in SNMPv3 will be set to the same value as the Security Name. Since versions 1 and 2 of SNMP do not support authentication or encryption, the Security Level in SNMPv3 is set to "No Authentication" and "No Privacy." The Security Model in SNMPv3 is set to SNMPv1, indicating that the security model from version 1 is in effect. The Security Access is set to "read only" and the View is set to "whole tree," similar to the values in FIG. 6A.

The conversion of the SNMPv1 model to the SNMPv3 model is made transparent to the user and is part of the process of mapping the data performed by the example server system management application. As a result, the user, e.g., the system administrator, is not made aware that the SNMPv1 configuration information entered is being converted into an SNMPv3 representation of the configuration information.

Returning to FIG. 5, as mentioned above, region 504 is a subtree in the MIB tree structure that has been designated read/write access for community "admin". FIGS. 7A and 7B show the mapping of this structure from SNMPv1 to SNMPv3, respectively for this subtree. The complete path to the subtree in question is 0.2, but following the convention of dropping the leading 0 we refer to the root of the subtree as 2. In the SNMPv1 configuration format, this becomes the View, as shown in FIG. 7A. The Community String is "admin" and the Access is "read write."

In FIG. 7B the information from FIG. 7A is mapped into a SNMPv3 format. The Security Name and Community Name are set to "admin." The Security Level specifies "No Authentication" and "No Privacy" and the Security Model is "SNMPv1." The Security Access is "read write" and the View is "2", the root node of the subtree.

Thus, with the present invention, a system administrator may configure a server using one of a plurality of graphical user interfaces (GUIs) based on the particular protocol version that the system administrator wishes to use when configuring the server, regardless of the actual protocol being used by the server. For example, even though the server uses SNMPv3, the system administrator may make use of a GUI designed to resemble SNMPv1 to configure the server. The configuration information entered by the system administrator will be converted into a SNMPv3 configuration file with the security model designated as SNMPv1 and fields not supported by SNMPv1 being set to default values. Thus, the server, although operating in SNMPv3, is able to recognize SNMPv1 data packets and manage sessions of SNMPv1 data packets.

If the system administrator so wishes, he/she can make use of a different GUI to configure the server using SNMPv3. This GUI will provide different configuration information fields from the SNMPv1 GUI and will be stored as SNMPv3 records in the configuration file with the security model set to SNMPv3. Thus, the same server that maintains a SNMPv1 configuration may also maintain a SNMPv3 configuration. Of course there may be multiple configurations in the same configuration file for each of the various protocol versions depending on the particular communities and users supported by the server.

As mentioned above, the same server SNMP agent can be configured, using more than one GUI, to use more than one protocol version. Thus, for example, the same server may maintain a configuration file that configures both SNMPv1 and SNMPv3. In this way, the server will be able to recognize and manage sessions that make use of either SNMPv1 and SNMPv3.

As an example, assume that a server SNMP agent has a configuration file in which the security models are set to SNMPv1 and SNMPv3. If a SNMP packet is received by the server SNMP agent, the agent retrieves the security model identifier from the header of the SNMP packet. If the security model of the SNMP packet is SNMPv1, the community string associated with the packet is extracted from the packet header and compared to the community string of all the configuration records having a security model set to SNMPv1. If a configuration record is found in which the community string matches the community string of the SNMP packet, the session is allowed access to the server SNMP agent, subject to the view established for the community string.

Furthermore, if a SNMP packet is received with the security model of the packet being set to SNMPv3, the user name and password are extracted from the header of the SNMP packet and compared to the user name and password of each of the configuration records whose security model is set to SNMPv3. If a match is found, the session is allowed access to the server SNMP agent. Thus, the server SNMP agent is capable of handling sessions for both versions 1 and 3 of the SNMP protocol.

Thus, with the present invention, a system administrator may configure a server SNMP agent to use any version of a protocol. Furthermore, during the process of inputting the configuration information, the system administrator is presented with a GUI that is tailored to resemble a particular version of the protocol that is being used to configure the server. The GUI that is presented will closely resemble fields that are used by that version of the protocol. Then, regardless of the protocol version GUI used to enter the configuration information, the configuration information records will be stored in a configuration file for the version of the protocol used by the server SNMP agent. However, the configuration record will have a security model set to the particular version of the protocol used to configure the server SNMP agent. In this way, sessions of SNMP packets of various protocol versions may be received by the server SNMP agent.

Figure 8:
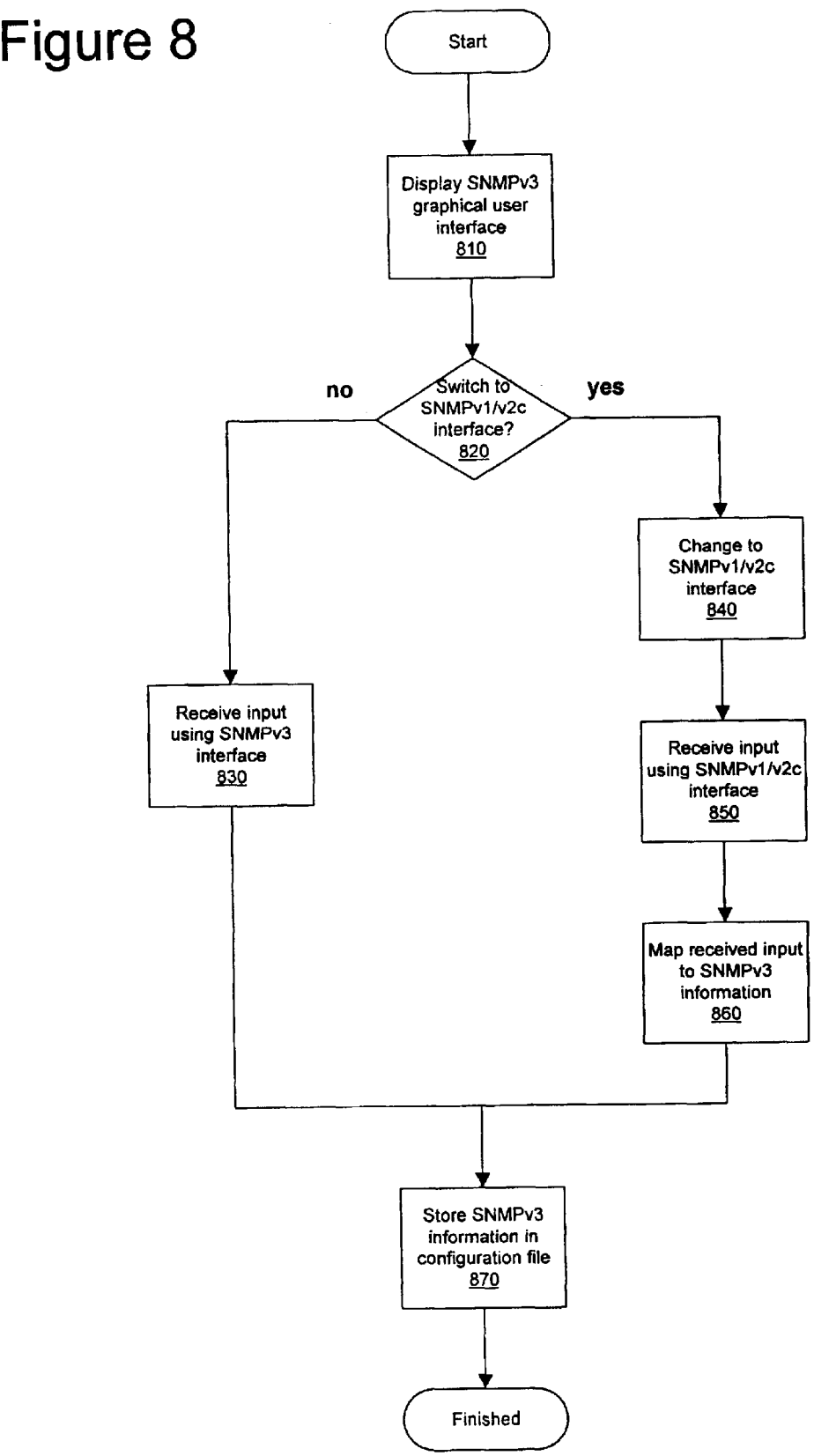
FIG. 8 is a flowchart outlining an exemplary operation of the present invention.

FIG. 8 is a flowchart outlining an exemplary operation of the present invention when configuring a SNMP agent device. As shown in FIG. 8, the operation starts with providing a SNMPv3 USM graphical user interface display to the user (step 810). A determination is made as to whether or not the user changes the graphical user interface display to a SNMPv1/v2c community-based graphical user interface display (step 820). If not (step 820: no), input is received from a user via the SNMPv3 graphical user interface display (step 830) and stored as SNMPv3 configuration information in a configuration file (step 870).

If the user selects to change the SNMPv3 USM graphical user interface display to a SNMPv1/v2c community-based graphical user interface display (step 820: yes), the display is changed (step 840) and input from the user using the SNMPv1/v2c community-based graphical user interface display is received (step 850). The SNMPv1/v2c community-based configuration information input by the user in step 850 is then mapped into a SNMPv3 format (step 860). The mapped SNMPv3 formatted configuration information is then stored in a configuration file (step 870). Mapping may be performed in the manner set forth above. Thereafter, the operation ends. This operation may be repeated as additional configuration information is entered via the graphical user interface of the present invention.

Thus, the present invention provides an easily understandable interface for system administrators and other users of SNMP agent devices such that these users may enter configuration information in a format with which they are familiar. The present invention provides a mechanism by which the configuration information may be mapped to a currently used protocol format in a manner that the user is not made aware of the mapping.

The description of the present invention has been presented for purposes of illustration and description but is not intended to be exhaustive or limited to the invention in the form disclosed. Many modifications and variations will be apparent to those of ordinary skill in the art. For example, as discussed above, while the present invention has been described with reference to the SNMPv1, SNMPv2 and SNMPv3 management protocols, the invention is not limited to these protocols. Rather, the present invention is applicable to all protocols in which multiple versions are utilized and configuration information may be mapped from one version to another. For example, the present invention may operated with Lightweight Directory Access Protocol (LDAP) or CIM (Common Information Model).

The embodiment was chosen and described in order to best explain the principles of the invention and the practical application, and to enable others of ordinary skill in the art to understand the invention for various embodiments with various modifications as are suited to the particular use contemplated.

What is claimed:

1. A method in a distributed data processing system for configuring a server, comprising:
   providing a graphical user interface to configure the server using a first version of a protocol;
   mapping configuration information for the first version of the protocol entered using the graphical user interface into a format associated with a second version of the protocol, wherein mapping configuration information includes setting default values for attributes not specified in the first version of the protocol that are present in the second version of the protocol; and
   configuring the server based on the mapped configuration information.

2. The method of claim 1, further comprising providing a second graphical user interface to configure the server using the second version of the protocol, wherein the graphical user interface displays options comprising User name, Authentication, Authentication Key, Privacy, Privacy Key, Key Type and Storage Type.

3. The method of claim 2, wherein the second graphical user interface lists groups compatible with SNMP version 3.

4. The method of claim 2, wherein the second graphical user interface allows the network manager to specify a security level.

5. The method of claim 1, wherein the graphical user interface displays options comprising Community name, Network address, Network mask and Storage Type.

6. The method of claim 1, wherein the graphical user interface lists groups compatible with SNMP versions 1 and 2c.

7. The method of claim 1, wherein the graphical user interface defaults a security level to No Authentication and No Privacy.

8. The method of claim 1, wherein the protocol is SNMP, the first version of the protocol is one of SNMP version 1 and SNMP version 2c and wherein the second version of the protocol is SNMP version 3.

9. The method of claim 1, wherein the mapping is performed in a transparent manner with respect to a user.

10. A method of configuring an agent device, comprising:
    receiving configuration information formatted for a first version of a management protocol;
    mapping the configuration information into a format for a second version of a management protocol, wherein mapping the configuration information includes setting attribute values for attributes in the mapped configuration information to a default value if the values for the attributes are not specified in the received configuration information; and
    configuring the agent device based on the mapped configuration information.

11. The method of claim 10, wherein mapping the configuration information includes changing a value of a Community String to the value of a Community Name.

12. The method of claim 10, wherein setting attribute values for attributes in the mapped configuration information to a default value includes setting a security level to a value of No Authentication and No Privacy.

13. The method of claim 10, wherein the management protocol is SNMP and the first version of the management protocol is SNMP version 1 or SNMP version 2, and wherein the second version of the management protocol is SNMP version 3.

14. The method of claim 10, wherein the mapped configuration information includes a User name attribute, an Authentication attribute, an Authentication Key attribute, a Privacy attribute, a Privacy Key attribute, a Key Type attribute and a first Storage Type attribute.

15. The method of claim 14, wherein the received configuration information includes a Community name attribute, a Network address attribute, a Network mask attribute and a second Storage Type attribute.

16. The method of claim 15, wherein mapping the configuration information includes mapping the Community name attribute to the User name attribute.

17. The method of claim 10, wherein mapping the configuration information includes mapping a community string in the first version to a community name in the second version, mapping the community string in the first version to a security name in the second version, mapping a first object tree view in the first version to a second object tree view in the second version, and mapping an access in the first version to a security access in the second version.

18. The method of claim 10, wherein the mapping is performed in a transparent manner with respect to a user.

19. A data processing system for configuring a server, comprising:
   interfacing means for providing a graphical user interface to configure the server using a first version of a protocol;
   mapping means for mapping configuration information for the first version of the protocol entered using the graphical user interface into a format associated with a second version of the protocol, wherein the manning means sets default values for attributes not specified in the first version of the protocol that are present in the second version of the protocol; and
   configuring means for configuring the server using the mapped configuration information.

20. The data processing system of claim 19, further comprising second interfacing means for providing a second graphical user interface to configure the server using a the second version of the protocol, wherein the second graphical user interface displays options comprising User name, Authentication, Authentication Key, Privacy, Privacy Key, Key Type and Storage Type.

21. The data processing system of claim 20, wherein the second graphical user interface lists groups compatible with SNMP version 3.

22. The data processing system of claim 20, wherein the second graphical user interface allows the network manager to specify a security level.

23. The data processing system of claim 19, wherein the graphical user interface displays options comprising Community name, Network address, Network mask and Storage Type.

24. The data processing system of claim 19, wherein the graphical user interface lists groups compatible with SNMP versions 1 and 2c.

25. The data processing system of claim 19, wherein the graphical user interface defaults a security level to No Authentication and No Privacy.

26. The data processing system of claim 19, wherein the data processing system manages the SNMP protocol, the first version of the protocol is one of SNMP version 1 and SNMP version 2c and wherein the second version of the protocol is SNMP version 3.

27. The data processing system of claim 19, wherein the data processing system performs the mapping in a transparent manner with respect to a user.

28. An apparatus for configuring an agent device, comprising:
   receiving means for receiving configuration information formatted for a first version of a management protocol;
   mapping means for mapping the configuration information into a format for a second version of a management protocol, wherein the mapping means sets attribute values for attributes in the mapped configuration information to a default value if the values for the attributes are not specified in the received configuration information; and
   configuring means for configuring the agent device based on the mapped configuration information.

29. The apparatus of claim 28, wherein the mapping means changes a value of a Community String to the value of a Community Name.

30. The apparatus of claim 28, wherein the mapping means sets attribute values for attributes in the mapped configuration information to a default value includes setting a security level to a value of No Authentication and No Privacy.

31. The apparatus of claim 28, wherein the configuring means uses the SNMP management protocol and the first version of the management protocol is SNMP version 1 or SNMP version 2, and wherein the second version of the management protocol is SNMP version 3.

32. The apparatus of claim 28, wherein the receiving means receives configuration information including a User name attribute, an Authentication attribute, an Authentication Key attribute, a Privacy attribute, a Privacy Key attribute, a Key Type attribute and a first Storage Type attribute.

33. The apparatus of claim 32, wherein the received configuration information includes a Community name attribute, a Network address attribute, a Network mask attribute and a second Storage Type attribute.

34. The apparatus of claim 33, wherein the mapping means includes mapping the Community name attribute to the User name attribute.

35. The apparatus of claim 28, wherein the mapping means includes mapping a community string in the first version to a community name in the second version, mapping the community string in the first version to a security name in the second version, mapping a first object tree view in the first version to a second object tree view in the second version, and mapping an access in the first version to a security access in the second version.

36. The apparatus of claim 28, wherein the mapping means is performed in a transparent manner with respect to a user.

37. A computer program product for configuring a server, comprising:
   first instructions for providing a graphical user interface to configure the server using a first version of a protocol;
   second instructions for mapping configuration information entered using the graphical user interface into a format associated with a second version of the protocol and for setting default values for attributes not specified in the first version of the protocol that are present in the second version of the protocol; and
   third instructions for configuring the server based on the mapped configuration information.

38. The computer program product of claim 37, further comprising fourth instructions for providing a second graphical user interface to configure the server using the second version of the protocol, wherein the fourth instructions further include instructions for displaying options comprising User name, Authentication, Authentication Key, Privacy, Privacy Key, Key Type and Storage Type.

39. The computer program product of claim 38, wherein the fourth instructions for providing the second graphical user interface includes instructions for listing groups compatible with SNMP version 3.

40. The computer program product of claim 38, wherein the fourth instructions for providing the second graphical user interface includes instructions that allow the network manager to specify a security level.

41. The computer program product of claim 37, wherein the first instructions for providing the graphical user interface includes instructions for displaying options comprising Community name, Network address, Network mask and Storage Type.

42. The computer program product of claim 37, wherein the first instructions for providing the graphical user interface includes instructions for listing groups compatible with SNMP versions 1 and 2c.

43. The computer program product of claim 37, wherein the first instructions for providing the graphical user interface provides instructions for setting a security level to No Authentication and No Privacy.

44. The computer program product of claim 37, wherein the first version of the protocol is one of SNMP version 1 and SNMP version 2c and wherein the second version of the protocol is SNMP version 3.

45. The computer program product of claim 37, wherein the second instructions includes instructions for mapping in a transparent manner with respect to a user.

46. A computer program product for configuring an agent device, comprising:
   first instructions for receiving configuration information formatted for a first version of a management protocol;
   second instructions for mapping the configuration information into a format for a second version of a management protocol, wherein the second instructions set attribute values for attributes in the mapped configuration information to a default value if the values for the attributes are not specified in the received configuration information; and
   third instructions for configuring the agent device based on the mapped configuration information.

47. The computer program product of claim 46, wherein the second instructions for mapping the configuration information includes instructions for changing a value of a Community String to the value of a Community Name.

48. The computer program product of claim 46, wherein the instructions for setting attribute values for attributes in the mapped configuration information to a default value includes instructions for setting a security level to a value of No Authentication and No Privacy.

49. The computer program product of claim 46, wherein the first version of the management protocol is SNMP version 1 or SNMP version 2, and wherein the second version of the management protocol is SNMP version 3.

50. The computer program product of claim 46, wherein the second instructions include instructions for creating the mapped configuration information, wherein the mapped configuration information includes a User name attribute, an Authentication attribute, an Authentication Key attribute, a Privacy attribute, a Privacy Key attribute, a Key Type attribute and a first Storage Type attribute.

51. The computer program product of claim 50, wherein the received configuration information includes a Community name attribute, a Network address attribute, a Network mask attribute and a second Storage Type attribute.

52. The computer program product of claim 51, wherein the second instructions include instructions for mapping the Community name attribute to the User name attribute.

53. The computer program product of claim 46, wherein the second instructions for mapping the configuration information includes instructions for mapping a community string in the first version to a community name in the second version, mapping the community string in the first version to a security name in the second version, mapping a first object tree view in the first version to a second object tree view in the second version, and mapping an access in the first version to a security access in the second version.

54. The computer program product of claim 46, wherein the second instructions include instructions for mapping in a transparent manner with respect to a user.

* * * * *

UNITED STATES PATENT AND TRADEMARK OFFICE
CERTIFICATE OF CORRECTION

PATENT NO.   : 6,795,862 B1
DATED        : September 21, 2004
INVENTOR(S)  : Keohane et al.

It is certified that error appears in the above-identified patent and that said Letters Patent is hereby corrected as shown below:

Column 11,
Line 34, after "wherein the" delete "manning" and insert -- mapping --.

Signed and Sealed this

First Day of March, 2005

JON W. DUDAS
*Director of the United States Patent and Trademark Office*